1

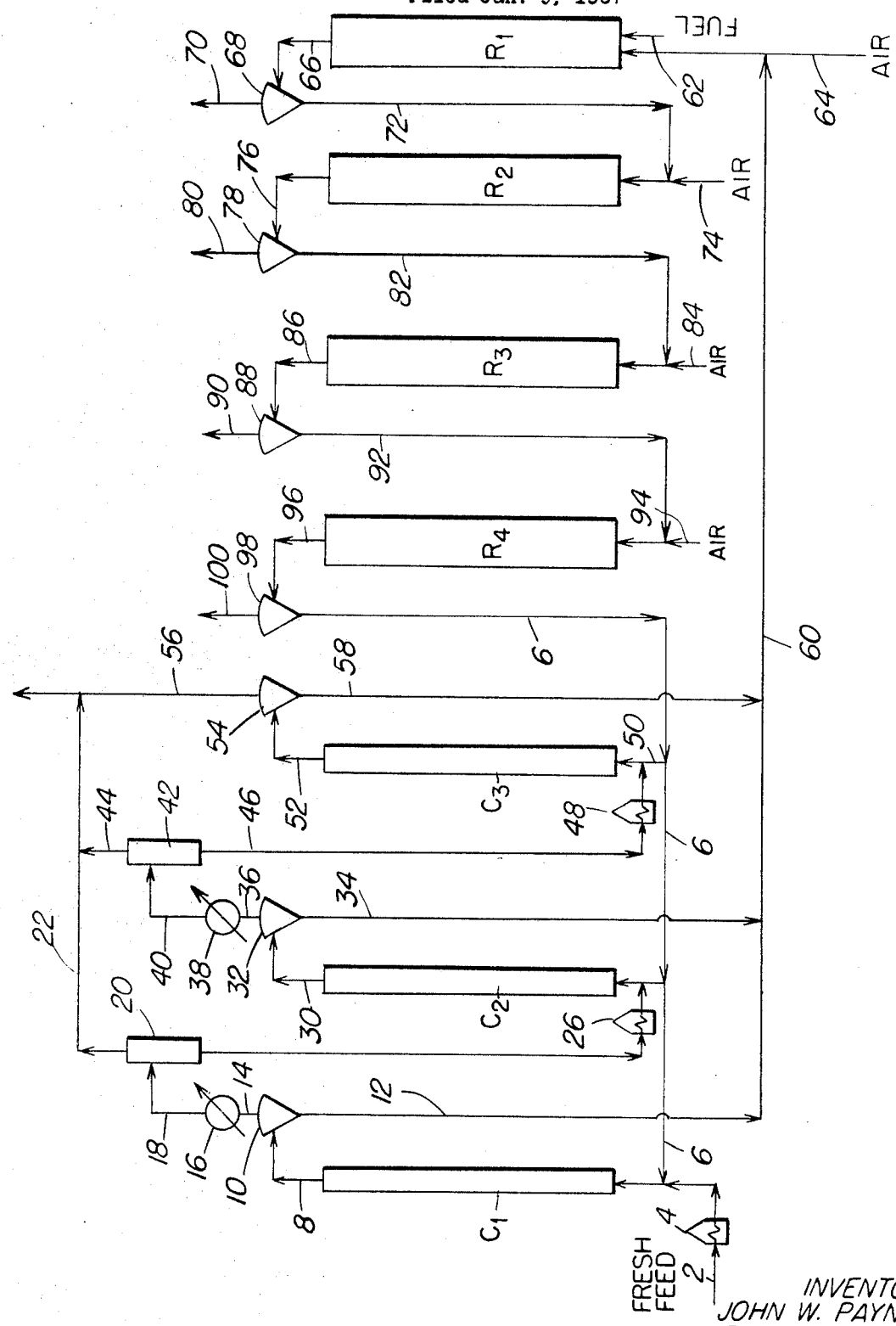

3,520,797
CATALYST FORWARD FLOW MULTIPLE PASS CRACKING - REGENERATION ARRANGEMENT FOR PROCESSING GAS OILS WITH HIGH ACTIVITY CATALYST
John W. Payne, Woodbury, Robert A. Sailor, Cinnaminson, and Jerome Farber, Cherry Hill, N.J., assignors to Mobil Oil Corporation, a corporation of New York
Filed Jan. 9, 1967, Ser. No. 608,080
Int. Cl. C10g 37/02
U.S. Cl. 208—72        10 Claims

ABSTRACT OF THE DISCLOSURE

Cracking of gas oil and high boiling product thereof to gasoline is accomplished with fresh regenerated catalyst in a plurality of separate catalyst forward flow contact zones arranged for flow of insufficiently converted hydrocarbon product only sequentially through the cracking contact zone, gasoline product is recovered from the hydrocarbon effluent of each contact zone, catalyst recovered from the separate cracking contact zones is passed as a combined stream sequentially through a plurality of separate contact zones comprising at least one catalyst heating zone and catalyst regeneration zones in contact with an oxygen atmosphere.

BACKGROUND OF THE INVENTION

It is known to crack hydrocarbon feed materials in the presence of catalyst particles in many different arrangements including fluid catalyst suspension comprising dense and dilute phase suspension systems or combinations thereof such as disclosed in U.S. Pat. 2,387,088, 2,425,555 and 2,921,014. During cracking in these arrangements, the catalyst mass becomes fouled or contaminated with hydrocarbonaceous material which reduces the activity of the catalyst thereby necessitating stripping and/or regeneration of the catalyst to restore catalyst activity.

It has been observed in these prior art processes that they all contain many inherent disadvantages contributing to excessive coke make, production of low grade product, ineffective usage of the catalyst, particularly with respect to its activity, incomplete effective restoration of catalyst activity during regeneration thereof, poor efficiency in converting to desired product, and in addition to other things, a large catalyst inventory and use of unnecessarily large quantities of the catalyst as a heat source. As a result thereof, in these prior art processes including fluid bed, moving bed and even some riser cracking operations, the conditions of vapor-catalyst contact must be selected for the average activity of the catalyst mass which is a mixture of materials having a wide range of activities, the average feed and the initial oil vapor feed most usually contacts an excessive amount of catalyst at the highest temperature, thereby resulting in over cracking of desired product to gas and coke. Furthermore, as the cracking operation is continued, coke deposition on the catalyst tends to reduce the catalyst activity whereby the catalyst becomes considerably less effective to accomplish the desired cracking operation in an efficient manner. In a prior art arrangement, such as passing a suspension of oil vapors and catalyst through a cracking zone often referred to as a riser cracking zone, wherein catalyst particles of a relative non-uniform activity are used because of improper regeneration of the catalyst, excess temperature and amounts of catalyst are required thereby contributing to the difficulties of producing desired product material. Accordingly, it may be said that these prior art methods and systems of operation all have inherent disadvantages in that they rely, for the most part, upon use of a large mass of catalyst having a wide range of catalyst particle activity at temperatures most suitable for converting a wide boiling range hydrocarbon feed at the average activity of the catalyst mass. Therefore, it is clearly evident that the temperature of the mass will be above that required for the catalyst particles of above average activity thereby causing over cracking to undesirable coke and gaseous products. Conversely, the same temperature will be too low to promote the desired cracking for that mass of catalyst particles having activities below the average activity of the mass. The combined effect of this undesired prior art method of operation requires the use of an excess amount of catalyst to obtain a desired conversion. In addition to the above, the prior art fluid and moving bed processes are not particularly suitable for the active crystalline aluminosilicate catalyst composition herein contemplated since they do not permit segregation of temperature and catalyst to oil ratio to take advantage of catalyst particles activity.

SUMMARY OF THE INVENTION

This invention relates to the segregated catalytic cracking of fresh feed hydrocarbon material and incompletely converted product in a plurality of cracking stages downstream thereof to form lower boiling fuels comprising gasoline boiling hydrocarbons in improved yields. In one aspect, the present invention is directed to an improved low inventory catalyst system for improving the yield of gasoline boiling hydrocarbons by cracking hydrocarbon feed material boiling above gasoline boiling constituents with a catalyst comprising a catalytically active crystalline aluminosilicate of desired activity in a sequence of segregated cracking zones through which the fresh hydrocarbon feed and incompletely converted product thereof are separately cracked with freshly regenerated catalyst particles.

In another aspect this invention relates to the method and arrangement of processing steps for using and maintaining catalyst particles therein of relative uniform and desired activity and in an amount selected to permit the segregated conversion of particular hydrocarbon feeds passed to each of a plurality of separate conversion or catalytic cracking zones. That is, by the method and process of the present invention, the amount of catalyst and operating conditions employed are selected to provide a desired hydrocarbon feed-catalyst mix temperature at any given reactor inlet and in an amount which will permit a desired limited cracking of the hydrocarbon feed under conditions inhibiting significant overcracking of desired $C_5+$ gasoline product material. Thus, in the method of this invention, relatively high activity catalyst particles including freshly regenerated catalyst particles either with or without fresh makeup catalyst particle material and containing low amounts of residual coke on regenerated catalyst particles in an amount less than about 0.25 percent by weight is separately passed to each of a plurality of parallel arranged reaction zones in amounts selected so that the catalyst to oil ratio employed in each conversion zone increases in the direction of flow of the insufficiently converted hydrocarbon feed passed sequentially through the plurality of conversion zones.

In one embodiment, the present invention relates to a catalytic cracking process effected in the presence of relatively high activity finely divided catalyst particles; the catalyst particles preferably containing a catalytically active crystalline aluminosilicate material. A hydrocarbon feed boiling above gasoline boiling material and a heavy condensate fraction obtained therefrom as herein described are subjected to the action of the fresh catalyst including freshly regenerated catalyst at cracking conditions in a plurality of limited contact time dispersed phase cracking zones, the catalyst and hydrocarbon vapors are separated upon discharge from each cracking zone, the catalyst so separated is passed after being subjected to a stripping action to catalyst regeneration, the hydrocarbon vapors separated from each cracking zone are cooled sufficiently to recover insufficiently converted high boiling hydrocarbons from gasoline and lower boiling hydrocarbons and the high boiling hydrocarbons thus recovered are passed to a separate parallel stage cracking zone in contact with freshly regenerated catalyst under cracking condition sufficiently severe to produce additional gasoline boiling product material therefrom.

In a more particular embodiment the present invention relates to cracking gas oil boiling hydrocarbons and insufficiently converted high boiling products thereof separately in a plurality of separate upwardly catalyst flowing cracking zones arranged for parallel flow of freshly regenerated catalyst to and through each cracking zone and sequential flow of hydrocarbon material boiling above gasoline boiling material separated from the product of each preceding cracking zone. The catalyst separated and recovered from the hydrocarbon product of each cracking zone may be combined or separately stripped to recover entrained hydrocarbonaceous material therefrom. The stripped catalyst is thereafter raised to regeneration temperatures and regenerated with an oxygen containing gas in one or more sequence of regeneration zones under conditions to effect substantially complete or partial removal of carbonaceous material from the catalyst particles and in amounts sufficient to maintain the catalyst particles relatively uniform in catalyst activity.

In yet another embodiment, the present invention relates to cracking gas oil and recycle product fractions thereof in separate cracking stages in the presence of fresh catalyst material in each stage of cracking maintained under limited conversion conditions of less than about 50% based on fresh feed. In one preferred arrangement, at least two separate stages of cracking are provided for insufficiently converted refractory material or recycle product material obtained from a preceding cracking stage at increasing conditions of severity maintained at least in part by increasing the catalyst to oil ratio employed in each cracking stage. The catalyst recovered from each stage of cracking is stripped separately or after being combined of hydrocarbon material entrained with the separated catalyst, heated to oxygen regeneration temperatures either by direct or indirect heat exchange means or a combination thereof and thereafter regenerated with an oxygen containing gas in a plurality of sequentially connected once through continuous forward flow catalyst regeneration zones of desired catalyst particle density to provide catalyst particles having a relatively uniform temperature up to about 1400° F. and relatively uniform in catalyst particle activity. The regenerated catalyst at a predetermined desired temperature and amounts is thereafter combined with the segregated and preheated oil feed fractions in an amount to provide a hydrocarbon feed-catalyst mix temperature at the separate reactor inlets of at least about 950° F. but below about 1150° F.

In substantially any catalytic hydrocarbon conversion operation, the important control variables of the unit are considered to be catalyst to oil ratio, contact time, reactor temperature and regeneration temperature. The cat/oil ratio which is the relation of the feed rate of the catalyst to the reactor to the rate of oil entering the reactor is tied to catalyst circulation and consequently has a marked effect on the severity of the catalytic conversion operation. However, severity is also affected by contact time, temperature and coke on catalyst so that there results generally in an increase in conversion following the longer contact time with the catalyst. The term conversion is conveniently defined as 100 minus the percentage of recovered oil boiling above about 450° F. One important variable relied upon in controlling conversion is the reactor temperature and this is effected by the temperature of the feed and catalyst mix passed to the reactor. In addition, the activity of the catalyst employed in the process and the type of feed material converted play a further important role. Thus, it is preferred that the catalyst should be maintained at a relatively high and more particularly, a uniform activity level upon introduction to the reactor so that the efficiency of the operation in any stage of cracking can be maintained at a high order of magnitude.

Although substantially any activity level of catalyst and type may be employed in the method of this invention, conversion catalysts such as amorphous siliceous type cracking catalysts, crystalline aluminosilicate type cracking catalysts or mixtures of the two catalyst, are contemplated. It is particularly desirable, however, to employ a high activity solid particle material conversion catalyst and preferably one containing a high percentage of a catalytically active crystalline aluminosilicate material.

It has been found after extensive investigation that significant and unexpected improvement in yields of gasoline can be realized by effecting the segregated conversion of hydrocarbon feed material in a plurality of separate conversion stages in the manner herein described with separation of the formed gasoline from the product of each stage prior to effecting the further conversion of insufficiently converted hydrocarbon material in subsequent conversion stages. It has also been found that the yield of gasoline is greatly dependent upon the severity of operation in each stage and thus the ratio of conversion of hydrocarbons in the plurality of stages. In the method of this invention, it has been found particularly desirable to employ a three-stage operation wherein the conversion in the first stage is limited to a value less than about 50% but above about 30% and the conversion level in a subsequent stage is generally about the same as that obtained in the preceding reaction zone from whence the insufficiently converted hydrocarbon feed is recovered. Accordingly, the insufficiently converted hydrocarbon material recovered from the product of one conversion stage and most usually referred to as the recycle fraction is employed as the hydrocarbon feed in a subsequent stage of conversion by the method of this invention.

The method and process of this invention has several advantages in that the gas oil feed and insufficiently converted condensation product thereof are contacted in a separate cracking stage with catalyst particle initially at a uniform desired activity obtained by a particular sequential treatment of oxygen regeneration of the catalyst. Regeneration of the spent catalyst is controlled in the sequential arrangement of this invention to assure uniform removal of coke and in some cases substantially complete removal of deposited carbonaceous material from the separate catalyst particles. In one specific embodiment it is contemplated leaving a relatively uniform abount of residual coke on the catalyst particles not exceeding about 0.25 percent by weight of the catalyst particles.

The separate stages of cracking herein described are controlled and maintained under conditions, depending upon the hydrocarbon feed material being converted, to avoid significant overcracking of formed and desired gasoline products of cracking. Thus, in the staged operation of this invention the hydrocarbon constituents being converted to gasoline boiling product are subjected to ever increasing stages of severity in the direction of flow of the insufficiently converted or most refractory hydrocarbon feed material passed through the process and this increased severity is maintained at least in part by employing a higher catalyst to oil ratio in each cracking stage as the refractory of the feed increases.

Typical hydrocarbon feeds that may be processed by the method of this invention include light and heavy gas oils obtained from atmospheric distillation, vacuum distillation and coker gas oils. The boiling range of these feeds may vary considerably and will generally be in the range of from about 450° F. to about 600° F. for light gas oils and from about 600° F. to about 1000° F. for heavy gas oil feeds. The reaction conditions are adjusted as suggested above according to the charge stock and the conversion level desired in each stage of cracking. Generally, the reaction temperature at the inlet to each cracking stage is selected from within the range of from about 950° F. to about 1150° F. and is generally a hydrocarbon feed-catalyst mix at a temperature of at least about 1000° F.; the catalyst to oil ratio is in the range of from about 2 to about 100 and the hydrocarbon contact time with the catalyst is generally within the range of from about 3 to about 10 seconds so that a conversion of fresh feed in the first cracking stage is maintained above about 30 and more usually about 40%. Conversion of insufficiently converted material in a subsequent staged based on fresh feed is only a portion of that achieved in a preceding stage, but about the same based on charge to the stage.

The catalysts useful in a present invention are those comprising catalytically active crystalline aluminosilicates, which have an initial relatively high activity and one that may be substantially above that attributable to an amorphous silicaalumina catalyst. They may be catalysts such as described in copending application Ser. No. 208,512, filed July 9, 1962. It has been found as a result of considerable experimental evidence that the catalyst comprising crystalline aluminosilicates in a catalytically active form are advantageous in view of product selectivity obtained by their use. It has also been noticed that when properly controlled, the gasoline yield to coke make in gas oil cracking has been very substantially more attractive than that obtainable with a more conventional amorphous cracking catalyst. Accordingly, the catalytically active crystalline aluminosilicate catalysts suitable for use in the method and system of this invention are materials of ordered internal structure in which atoms of alkali metal, alkaline earth metal, or metals in replacement thereof are arranged in a definite and consistent crystalline or ordered pattern. Their structures in one form or another contain a large number of small cavities interconnected by a number of still smaller openings. However, these cavities and openings are precisely uniform in size. The interstitial dimensions of openings in the crystal lattice of some of the zeolites limit the size and shape of a molecule (hydrocarbon) that can enter the interior of the aluminosilicate and it is such characteristics of crystalline zeolites that has led to their designation "Molecular Sieves."

Zeolites having the above characteristics include both natural and synthetic materials for example, chabazite, gmelinite, mesolite, ptiliolite, mordenite, natrolite, nepheline, sodalite, scapolite, lazurite, leucrite, and cancrinite. Synthetic zeolites may be of the "A" type, "X" faujasite type, "Y" faujasite type, "T" type, or other well known forms of molecular sieve including ZK zeolites such as those described in copending application Ser. Not 134,841 filed Aug. 30, 1961. Preparation of zeolites of some of these types is well known, having been described in the literature—for example, "A" type zeolite in U.S. 2,882,243; "X" faujasite type zeolite in U.S. 2,882,244; other types of materials in Belgium Pat. No. 577,642 and in U.S. 2,950,952. As initially prepared, the metal of the aluminosilicate is an alkali metal, usually sodium. Such alkali metal is subject to base-exchange with a wide variety of other metal ions. The molecular sieve materials so obtained are unusually porous, the pores having highly uniform molecular dimensions, generally between about 3 and possibly about 15 angstrom units in diameter. Each crystal of molecular sieve material contains literally billions of tiny cavities or cages interconnected by openings of unvarying diameter. The size, valence, and amount of the metal ions in the crystal can control the effective diameter of the interconnecting channels.

At the present time, there are commercially available materials of the "A" series and of the "X" faujasite series.

A synthetic zeolite known as "Molecular Sieve 4A" is a crystalline sodium aluminosilicate having openings of about 4 angstroms in diameter. In the hydrated form, this material is chemically characterized by the formula:

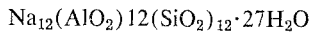

The synthetic zeolite known as "Molecular Sieve 5A" is a crystalline aluminosilicate salt having openings about 5 angstroms in diameter and in which substantially all of the 12 ions of sodium in the immediately above formula are replaced by calcium, it being understood that calcium replaces sodium in the ratio of one calcium for two sodium ions. A crystalline sodium aluminosilicate having pores approximately 10 angstroms in diameter is also available commercially under the name of "Molecular Sieve 13X." The letter "X" is used to distinguish the interatomic structure of this zeolite from that of the "A" crystals mentioned above. As prepared, the 13X material contains water and has the unit cell formula:

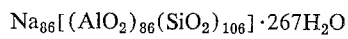

The 13X crystal is structurally identical with faujasite, a naturally occurring zeolite. The synthetic zeolite known as "Molecular Sieve 10X" is a crystalline aluminosilicate salt having openings about 10 angstroms in diameter and in which a substantial proportion of the sodium ions of the 13X material have been replaced by calcium.

Molecular sieves of the "X" faujasite series are characterized by the formula:

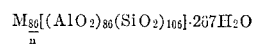

Where M is Na+, Ca++ or other metal ions introduced by replacement thereof and $n$ is the valence of the cation M. The structure consists of a complex assembly of 192 tetrahedra in a large cubic unit cell 24.95 A. on an edge. Both the so-called "X" and the so-called "Y" type crystalline aluminosilicates are faujasites and have essentially identical crystal structures. They differ from each other only in that type "Y" aluminosilicate has a hgiher $SiO_2/Al_2O_3$ ratio than the "X" type aluminosilicate.

The alkali metal generally contained in the naturally occurring or synthetically prepared zeolites described above may be replaced by other metal ions. Replacement is suitably accomplished by contacting the initially formed crystalline aluminosilicate with a solution of an ionizable compound of the metal ion which is to be zeolitically introduced into the molecular sieve structure for a sufficient time to bring about the extent of desired introductions of such ion. After such treatment, the ion-exchanged product is water washed, dried and calcined. The extent to which exchange takes place can be controlled. It is essential that the aluminosilicate undergoing activation be a metal containing aluminosilicate.

Naturally occurring or synthetic crystalline aluminosilicates may be treated to provide the superactive aluminosilicates employed in this invention by several means, such as base exchange to replace the sodium with rare earth metal compounds, by base exchange with ammonium compounds followed by heating to drive off $NH_3$ ions, leaving an H or acid form of aluminosilicates by treatment with mineral acid solutions to arrive at a hydrogen or acid form, and by other means. These treatments may be followed by activity-adjusting treatments, such as steaming, calcining, dilution in a matrix and other means. Explanation of the methods of preparing such catalysts is made in copending application Ser. No. 208,512, filed July 9, 1962.

It should be noted that the catalyst used in this invention may be a composite of the superactive aluminosilicate and a relatively inert matrix material, it may be a mechanical mixture of superactive material particles and matrix material particles, or it may consist only of the superactive catalyst. If the catalyst consists of a composite, it may be produced in the form of relatively small granules. The matrix material may be any hydrous oxide gel, clay or the like. The matrix material used must have a high porosity in order that the reactants may obtain access to the active component in the catalyst composite. A high porosity matrix of the hydrous oxide type may be used in these composite catalysts, such as silica-alumina complexes, silica-magnesia, silica gel, or high porosity clay, alumina, and the like.

Having thus provided a general description of the improved method of this invention, reference is now had to the drawing which presents by way of example one preferred arrangement of processing steps for practicing the invention.

BRIEF DESCRIPTION OF THE DRAWING

The drawing presented herewith diagrammatically presents an arrangement of processing steps for practicing the method of this invention wherein a plurality of elongated confined conversion zones $C_1$, $C_2$ and $C_3$ are provided in combination with a plurality of catalyst regeneration zones $R_1$, $R_2$, $R_3$ and $R_4$. Freshly regenerated catalyst is caused to move from the last of the sequence of regeneration zones in parallel flow arrangement through the conversion zones and spent catalyst particles recovered from the separate conversion zones are combined and passed in sequential flow arrangement through a catalyst heating zone and two or more stages of catalyst regeneration represented by zones $R_1$, $R_2$, $R_3$ and $R_4$.

DESCRIPTION OF SPECIFIC EMBODIMENTS

In the arrangement above briefly defined, a fresh gas oil hydrocarbon feed material is introduced to the process by way of line 2 and heated in heater 4 to an elevated temperature selected from within the range of about 500° F. to about 900° F. The preheated feed is then combined with fresh regenerated catalyst at an elevated temperature generally above about 1150° F. in line 6 to form a first suspension of catalyst particles in gasiform hydrocarbon feed having a temperature at the inlet to conversion zone $C_1$ of at least about 950° F. and preferably about 1000° F. If all of the hydrocarbon is in the liquid phase, a small amount of steam or other gas may be introduced with the oil or catalyst to provide a dispersing and suspending gas at the point of mixing. The thus formed suspension is caused to pass through the elongated confined conversion zone $C_1$ at a velocity sufficient to limit the residence time of hydrocarbon vapors therein within the range of from about three (3) to about 10 seconds. The suspension is discharged from the upper end of the transfer line conversion zone $C_1$ and then is passed by line 8 to separator 10 wherein catalyst particles are separated from hydrocarbon vapors. Separator 10, as well as separators 32 and 54, may be one or more cyclone separator arrangements that will be suitable for effecting the desired separation of catalyst particles from hydrocarbon vapors. The separated catalyst may be stripped in a zone adjacent to separator 10 and then be withdrawn by line 12 or combined with the catalyst recovered from the remaining conversion zone separators 32 and 54 more fully discussed below and then be stripped in a single stripping zone before being passed to regeneration treatment. The vaporous hydrocarbon material separated from the catalyst in separator 10 is then passed by line 14 to cooler 16 wherein partial cooling of the hydrocarbon stream is effected and thence by line 18 to separator drum 20. In cooler 16 the hydrocarbon vapors are sufficiently cooled to permit the primary recovery of gasoline and lower boiling hydrocarbons from insufficiently converted hydrocarbon material boiling above gasoline boiling material. Gasoline and lower boiling hydrocarbons are removed from separator 20 by conduit 22. The insufficiently converted hydrocarbon material separated in separator or drum 20 is withdrawn by line 24 and heated in furnace 26 to a desired elevated cracking temperature selected from within the range of about 500° F. to about 900° F. The hydrocarbon feed heated in furnace 26 is combined with hot regenerated catalyst at an elevated temperature generally of at least about 1150° F. in line 28 connecting with line 6 to form a hydrocarbon feed-catalyst second suspension having a mix temperature at the inlet to conversion zone $C_2$ of at least about 950° F. and preferably about 1000° F. The hydrocarbon-catalyst second suspension thus formed is caused to move upwardly through the transfer line conversion zone $C_2$ at a velocity selected to limit the residence time of the hydrocarbon therein within the range of from to about three (3) to about 10 seconds. The hydrocarbon catalyst suspension is discharged from conversion zone $C_2$ and passed by line 30 to separator 32. In separator 32 hydrocarbon vapors are separated from catalyst particles as discussed above with respect to separator 10 and the separated catalyst particles may thereafter be stripped in an adjacent zone or combined with other spent catalyst particles recovered from separator 10, 32 and 54 in the system and then be stripped before being passed to regeneration treatment. The separated hydrocarbon vapors, on the other hand, are passed from separator 32 by line 36 to cooler 38 and thence by line 40 to separator drum 42. In cooler 38 the hydrocarbon vapors are cooled sufficiently to permit separation of gasoline and lower boiling components from insufficiently converted hydrocarbon material boiling above the separated gasoline boiling hydrocarbons. The gasoline and lower boiling hydrocarbons are removed from separator 42 by conduit 44. The insufficiently converted hydrocarbon components separated in separator 42 are removed by line 46 and passed to heater furnace 48 wherein they are heated to a desired elevated temperature selected from within the range of about 500° F. to about 900° F. The hydrocarbon feed after heating is then combined with fresh hot regenerated catalyst in line 50 connected to line 6 in an amount sufficient to form a third suspension of hydrocarbon material and catalyst particles having a mix temperature at the inlet of conversion zone $C_3$ above about 950° F. and usually about 1000° F. The third suspension thus formed is caused to move through transfer line conversion zone $C_3$ at a velocity sufficient to provide a hydrocarbon residence time within the range of from about three (3) to about 10 seconds. The suspension in conversion zone $C_3$ is discharged from the upper end thereof and passed by line 52 to a catalyst separator 54. In separator 54 catalyst particles are separated from hydrocarbon vapors as above described and thereafter stripped to remove any entrained hydrocarbon vapors from the separated catalyst particles. This stripping of the separated catalyst may be accomplished in a zone adjacent to separator 54 or in a separate stripping zone not shown as a combined stream to which all of the spent catalyst is passed as discussed above. The hydrocarbon vapors separated from the catalyst in zone 54 is combined with the gasoline and lower boiling hydrocarbons recovered from each of separation zones 20 and 42 by line 22 and 44 and this combined gasoline product and lower boiling hydrocarbon stream is thereafter passed by line 56 to suitable product recovery fractionation equipment not shown. The catalyst separated in separator 54 is withdrawn by conduit 58 and combined with the spent catalyst in lines 12 and 34. It is to be understood that separators 10, 32 and 14 may be substantially any suitable separator arrangements which will permit the desired separation of catalyst particles from hydrocarbon material and the recovery of catalyst particles by withdrawal through lines 12, 34 and 58. These withdrawal lines may be catalyst standpipes in which at least partial or complete stripping of the catalyst may be accomplished with a suitable stripping gas such as steam, gaseous hydrocarbons, flue gases, hydrogen containing gases and other gaseous materials generally considered inert to the process and catalyst. On the other hand, it is contemplated as indicated above of combining the separated catalyst recovered from the separators 10, 32 and 54 in a common stripping zone and then stripping the catalyst at an elevated temperature above about 900° F. of any entrained hydrocarbonaceous material. The stripped catalyst is recovered at a relatively high temperature and passed as a combined stream in line 60 to regeneration treatment more fully discussed below.

In the regeneration arrangement of the process of this invention the catalyst is caused to move sequentially through a plurality of elongated confined contract zones of increasing temperature in the direction of catalyst flow. Initially the spent catalyst containing unstrippable carbonaceous deposits is raised to an elevated regeneration temperatures of at least about 1000° F. either by indirect, direct or a combination of indirect and direct heat exchange means. In the particular arrangement of the drawing the catalyst in line 60 is brought up to regeneration temperatures by direct contact with combustion products of a fuel-air mixture introduced by lines 62 and 64 respectively to the catalyst preheat zone identified as $R_1$. In the preheat contact zone $R_1$, the spent catalyst temperature is raised to a regeneration temperature of at least about 1000° F. by direct contact with the combustion products of a fuel-air mixture and a partial burning of at least a portion of the deposited carbonaceous material on the catalyst particles. Preferably the temperature of the catalyst is raised by this technique to about 1200° F. as it moves through contact zone $R_1$. The catalyst particles are removed from the upper end of zone $R_1$ in a specific embodiment at a temperature of about 1200° F. by line 66 and passed to a separator 68 which may comprise one or more cyclone separators for the recovery of hot catalyst particles from gaseous products of combustion. Flue gas is removed from separator 68 by line 70 and the separated catalyst is recovered at an elevated regeneration temperature, withdrawn by line 72, combined with additional preheated air or oxygen containing gas introduced by line 74 and the mixture thus formed is introduced as a hot suspension of at least about 1200° F. to an additional stage of catalyst regeneration $R_2$ maintained under conditions to remove additional amounts of carbonaceous material from the catalyst at the elevated regeneration temperature. The catalyst partially regenerated in $R_2$ is passed by line 76 to a separator 78 wherein the partially regenerated catalyst particles are separated from regeneration product gas in a manner similar to that discussed with respect to separator 68. Regeneration combustion gas or flue gas is removed from separator 78 by line 80 and the partially regenerated catalyst at an elevated temperature is recovered and withdrawn by line 82 for transfer to a further regeneration stage $R_3$.

The partially regenerated catalyst in line 82 is combined with additional air or oxygen containing regeneration gas introduced by line 84 to form a suspension which passes up through regeneration zone $R_3$ under conditions to effect a further removal of carbonaceous deposits from the catalyst. The catalyst further regenerated in regeneration zone $R_3$ is passed by line 86 to catalyst separator 88 wherein regeneration combustion gas is separated from catalyst particles which have been subjected to further conditions of coke removal. The separated combustion gas is recovered by line 90 from separator 88. The separated catalyst is withdrawn by line 92 combined with additional combustion supporting gas introduced by line 94 to form a suspension at regeneration temperature for passage upwardly through regeneration zone $R_4$. In regeneration zone $R_4$ additional coke or carbonaceous material is removed from the catalyst by burning. The further regenerated catalyst at an elevated temperature is passed by line 96 to separator 98 wherein catalyst is separated from combustion gases. The regenerated catalyst is withdrawn from separator 98 by line 6 and thereafter is passed to the separate conversion zones for use therein as hereinbefore described.

In the arrangement above discussed, the catalyst recovered from the conversion or catalytic cracking zones is caused to flow in sequential flow arrangement through a catalyst preheating zone and a plurality of stages of catalyst regeneration with a controlled amount of combustion supporting gas to permit a controlled regeneration of the catalyst in the separate stages. By this arrangement substantially all of the coke may be removed from the catalyst particles or a relatively uniform amount of residual coke may be left on the catalyst particles. On the other hand this arrangement discussed permits the recovery of a regenerated catalyst which is at an elevated temperature equal to or above that required in the cracking zones so that it may be employed in indirect heat exchange to heat the feed or catalyst passed to the regeneration stages before recycle to the cracking stages above discussed.

Although not specifically shown on the drawing it is to be understood that suitable means for preheating the combustion supporting gas passed to each stage of regeneration is generally provided and the stages of regeneration may be effected under conditions of increasing temperature in the direction of catalyst flow so that the catalyst recovered from the last regeneration stage will have a temperature of at least about 1150° F. and more usually at least about 1250° F. or higher such as about 1400° F.

In the arrangement specifically shown and described above it is contemplated limiting the length of the riser reactors and regeneration zones from about 100 ft. to about 150 ft. high and varying the concentration or density of catalyst in the upwardly flowing suspension passing through each zone substantially as desired from a dilute suspension to a relatively dense catalyst suspension so that the desired severity of operation can be achieved in the various separate stages of contact in the process. It is also to be understood that the separate contact zones may not all need to be of the same diameter so that the conversion of hydrocarbon feed passed to any one stage may be controlled to a desired level in the separate stage. It can be seen by the table of data presented herewith that in one specific embodiment to obtain a total conversion of about 72% and a residence time in the 100 ft. reactors of not more than about 3 seconds, that the diameters of the second and third cracking stage reactors were decreased while the catalyst to oil ratio was substantially increased in each cracking stage. It is contemplated on the other hand of varying the length of the separate stages of hydrocarbon conversion so that a desired conversion can be obtained in the separate stages.

Although a plurality of catalyst regeneration zones $R_1$ through $R_4$ have been shown and described it is to be understood that a lesser number may be employed than in our arrangement so that the catalyst passed to $R_1$ is brought up to regeneration temperatures by direct heat exchange with hot gaseous products of combustion and partial removal of deposited carbonaceous material from the catalyst. Thereafter in one or more subsequent catalyst regeneration zones, a desired further removal of deposited carbonaceous material is completed with oxygen regeneration gas. It is also to be understood that it is contemplated employing contact zone $R_1$ primarily for heating the catalyst up to temperatures of at least about 1000° F. and as high as about 1200° F. and thereafter the heated catalyst is passed through a series of stages of dispersed catalyst phase regenerations in the presence of oxygen containing regeneration gas. In a particular embodiment it is contemplated removing carbonaceous deposits from the catalyst particles to the extent that the remaining residue amounts to not more than about 0.1% by weight on each particle of catalyst. By maintaining such a low carbon residue on the regenerated catalyst in conjunction with a catalyst comprising about 10% and as high as 15 or 20% by weight of catalytically active crystalline aluminosilicate, the unusual and unexpected processing improvements herein described may be realized.

In the foregoing discussion a preferred method and arrangement of processing steps for practicing the invention has been described and it will be apparent to those skilled in the art that various modifications may be made thereto without departing from the essential features of the invention.

Table I presented below provides a comparison of the results obtained when comparing a single pass cracking operation with a multi-pass operation of the type specifically shown in the drawing.

TABLE I

[Basic: 30,000 b./d.—72.6% conversion (3 passes, 35% conversion per pass) of wide cut Mid-Cont. Gas Oil over Durabead 5 (10% REX). Pressure, 20 p.s.i.g.—all vessels 100 ft. high]

| | Single pass | Mult. pass (total) | 1st pass | 2nd pass | 3rd pass |
|---|---|---|---|---|---|
| Conversion (fresh feed) | 72 | 72.6 | 35 | 22.8 | 14.8 |
| Cat/oil wt. (fresh feed) | 9.6 | 5.9 | 1.6 | 1.9 | 2.4 |
| Cat/oil, to pass | | | 1.6 | 2.9 | 5.6 |
| Cat. circulation, T/H | 1,850 | 1,136 | 308 | 366 | 462 |
| Oil circulation, b./d. to pass | 30,000 | 30,000 | 30,000 | 19,500 | 12,700 |
| Coke on cat., to reactor, wt. percent | .1 | .1 | .1 | .1 | .1 |
| Coke on cat., from reactor, wt. percent | .28 | ¹.31 | .28 | .31 | .34 |
| Temp., mixed inlet, °F | 1,000 | 1,000 | 1,000 | 1,000 | 1,000 |
| Temp., outlet | 956 | ¹970 | 932 | 966 | 1,000 |
| Residence time in reactor, sec | 3 | | 3 | 3 | 3 |
| Diameter, ft | 3.2 | | 2.8 | 2.2 | 1.8 |
| Yields: | | | | | |
|   Dry gas, wt. percent charge | 6.1 | 4.8 | | | |
|   C₄'s, vol. percent charge | 16.3 | 9.5 | | | |
|   C₄-free gasoline, vol. percent charge | 58.0 | 69.0 | | | |
|   Coke, percent wt | 1.72 | 1.24 | | | |
| Recycle operation: C₄-free gasoline, vol. percent charge | 61.0 | | | | |

¹ Average.

In the above-presented table, the yield of $C_4$ free gasoline obtained by, for example, a recycle operation is presented for comparison with the single pass operation and the multi-stage operation of this invention. It is to be observed upon examination of the data presented in the table that in a unit employing all vessels of about 100 feet in height that the multi-pass operation of this invention operated under conditions to achieve about 72% conversion of a Mid-Continent Gas Oil achieved a significant increase in desired gasoline product (330 barrels per day for a 30,000 b.d. unit) over that obtained by the recycle and single pass operation. Furthermore, also significantly less dry gas, coke and $C_4$ hydrocarbons were produced in the multi-pass operation of this invention. In addition, it was found quite unexpectedly that significantly less catalyst was required in the multi-pass operation that required in the single pass operation thereby providing further significant operating advantages for the multi-pass operation over the single pass operation.

It is to be observed in view of the above that utilization of the process of this invention permits facile treatment of feeds containing low and high boiling hydrocarbon constitutents. Thus, in the cracking of gas oil burning hydrocarbons particularly with high activity aluminosilicate cracking catalyst, substantially optimum cracking conditions are readily obtainable for improving the yield of desired gasoline product material and the formation of carbonaceous contaminants and undesirable gaseous product material is appreciably reduced with a lower inventory of catalyst than obtainable hereinbefore.

We claim:

1. In the catalytic cracking of hydrocarbons to gasoline boiling product and regeneration of the catalyst particles employed therein the improvement for increasing the yields of gasoline product and reducing the catalyst inventory required therein which comprises, (a) passing streams of freshly regenerated finely divided siliceous catalyst particles at an elevated temperature not exceeding about 1200° F. through at least three separate parallel arranged cracking zones suspended in gasiform hydrocarbon reactant material under catalytic cracking conditions sufficient to convert a portion of the hydrocarbon reactant and deposit carbonaceous material on the catalyst particles, (b) said gasiform hydrocarbon reactant material comprising fresh hydrocarbon feed material in at least one of the cracking zones and insufficiently converted hydrocarbon material separated from the product effluent of a cracking zone being employed as the gasiform hydrocarbon reactant material in one of the remaining cracking zones, (c) separately recovering hydrocarbon material and catalyst particle material from the effluent of each separate cracking zone, (d) stripping the catalyst recovered from the separate reaction zones and heating the stripped catalyst to an elevated temperature sufficient to initiate removal of carbonaceous material from the catalyst particles by burning in an oxygen containing atmosphere, (e) passing the heated catalyst sequentially through a plurality of dispersed catalyst phase regeneration zones in contact with oxygen containing gas and under conditions selected to limit the catalyst temperature from exceeding about 1400° F., (f) recovering finely divided regenerated catalyst particles from the last of said sequence of regeneration zones at an elevated temperature and containing an amount of residual coke thereon less than about 0.25% by weight, (g) and passing catalyst particles thus regenerated at a desired temperature to said plurality of cracking zones as recited in (a) above.

2. The method of claim 1 wherein conversion of the fresh hydrocarbon feed in the first stage of cracking is limited within the range of from about 30 to about 50%.

3. The method of claim 1 wherein the temperature of a mixture of the hydrocarbon feed material and catalyst at the inlet of each cracking zone is at least about 1000° F.

4. The method of claim 1 wherein the catalyst to oil ratio in the cracking zones is maintained in the range of from about 1 to 10 and the hydrocarbon contact time with catalyst in any one cracking zone is maintained within the range of from about 2 to about 10 seconds.

5. The method of claim 1 wherein the conversion of fresh feed in the first stage of cracking is at least about 40% and a total conversion of the fresh hydrocarbon feed to gasoline product in the plurality of cracking stages exceeds about 70%.

6. The method of claim 1 wherein the siliceous catalyst particles contain up to about 20% by weight of a crystalline aluminosilicate material catalytically active for converting hydrocarbon material.

7. The method of claim 1 wherein oxygen containing gas is combined with the catalyst passed to each stage of regeneration and carbon residue remaining on the catalyst particles separated from the last stage of regeneration amounts to not more than about 0.1% by weight of each particle of catalyst.

8. The method of claim 1 wherein gasoline boiling product is separated from insufficiently converted hydrocarbon material in the hydrocarbon effluent recovered from each stage of cracking and insufficiently converted hydrocarbon material is cascaded to another of the parallel cracking zone maintained under cracking conditions including a higher catalyst to oil ratio than employed in the cracking zone from which the insufficiently converted hydrocarbon feed is recoverd.

9. The method of claim 1 wherein the catalyst recovered from the hydrocarbon effluent of each cracking zone is separately stripped of entrained hydrocarbon material and thereafter the stripped catalyst is heated as a combined stream to regeneration temperatures by direct contact with hot combustion product gases.

10. The method of claim 1 wherein the effluent of each stage of cracking is partially cooled to permit separation of gasoline boiling components from higher boiling hydrocarbon components and the thus higher boiling hydrocarbon components are thereafter preheated sufficiently so that upon admixture with the hot regenerated catalyst passed to each cracking zone that a mixed temperature at the inlet of each cracking zone will be at least about 1000° F.

References Cited

UNITED STATES PATENTS

| | | | |
|---|---|---|---|
| 2,425,555 | 8/1947 | Nelson | 208—156 |
| 3,347,778 | 10/1967 | Dill et al. | 708—74 |
| 3,393,146 | 7/1968 | Dill et al. | 708—74 |

DELBERT E. GANTZ, Primary Examiner

A. RIMENS, Assistant Examiner

U.S. Cl. X.R.

208—156

PO-1050
(5/69)

UNITED STATES PATENT OFFICE
CERTIFICATE OF CORRECTION

Patent No. 3,520,797　　　　　　　　Dated　July 22, 1970

Inventor(s) JOHN W. PAYNE, ROBERT A. SAILOR and JEROME FARBER

It is certified that error appears in the above-identified patent and that said Letters Patent are hereby corrected as shown below:

| | | |
|---|---|---|
| Column 5, Line 10, | : | "100" should be --10-- |
| Column 5, Line 56, | : | "Not" should be --No.-- |
| Column 6, Line 41, | : | "hgiher" should be --higher-- |
| Column 8, Line 61, | : | "14" should be --54-- |
| Column 11, " 46, | : | "that" should be --than-- |
| Column 11, " 52, | : | "burning" should be --boiling-- |
| Column 13, " 16, | : | "the thus higher" should be --the thus obtained higher-- |

SIGNED AND
SEALED
OCT 13 1970

(SEAL)
Attest:

Edward M. Fletcher, Jr.
Attesting Officer

WILLIAM E. SCHUYLER, JR.
Commissioner of Patents